April 20, 1965  A. G. LUTHI ETAL  3,179,041
FOOD CANNING MACHINE
Filed Sept. 16, 1963  10 Sheets-Sheet 1

FIG. 1

INVENTORS
ALOIS G. LUTHI
EDWARD E. DUTTON
BY
Mellin and Hanscom
ATTORNEYS

Fig. 2

INVENTOR.
ALOIS G. LUTHI
EDWARD E. DUTTON
BY
Mellin and Hanscom
ATTORNEYS

INVENTOR.
ALOIS G. LUTHI
EDWARD E. DUTTON
BY
Mellin and Hanscom
ATTORNEYS

April 20, 1965 A. G. LUTHI ETAL 3,179,041
FOOD CANNING MACHINE
Filed Sept. 16, 1963 10 Sheets-Sheet 5

FIG. 5

INVENTOR.
ALOIS G. LUTHI
EDWARD E. DUTTON
BY
Mellin and Hanscom
ATTORNEYS

Fig. 6

April 20, 1965   A. G. LUTHI ETAL   3,179,041
FOOD CANNING MACHINE
Filed Sept. 16, 1963   10 Sheets-Sheet 9

INVENTOR.
ALOIS G. LUTHI
EDWARD E. DUTTON
BY
Mellin and Hanscom
ATTORNEYS

United States Patent Office 3,179,041
Patented Apr. 20, 1965

3,179,041
FOOD CANNING MACHINE
Alois G. Luthi, Gardena, and Edward E. Dutton, Whittier, Calif., assignors to Luthi Machinery & Engineering Co., Inc., Los Angeles, Calif., a corporation of California
Filed Sept. 16, 1963, Ser. No. 309,130
9 Claims. (Cl. 100—223)

This invention relates to can filling machines, and more especially to a machine used for canning fish, meat or any substantially homogeneous and compressible food product.

This invention relates to improvements in can filling machines as described in United States Patent No. 3,026,660.

In brief, this invention teaches a food canning machine comprising a pair of turrets, one for forming a compressed slug of food from loose and unconfined food material, and a second turret for transferring slugs of food from metering pockets into cans. The first turret, referred to herein as the slug forming turret, is similar to other machines of its kind in that a number of rams are circumferentially arranged on the turret to compress loose food material into a metering pocket. Unlike conventional structures, however, each ram is held under the same pressure, being urged toward food compressing positions within complementary food receiving containers. For this purpose, the turret includes a manifold ring to which each ram is fluidly connected. A predetermined operating pressure is maintained in the manifold ring, and the rams are cyclically operated against that pressure by means of cams. As a consequence of such a structure, the slug forming turret will compress each slug to the same degree, and the operation is carried out without valve manipulations or controls.

Another feature of the invention involves the use of a control device for maintaining a proper amount of loose food product on the slug forming turret. Inasmuch as this turret completely forms a metered slug of food without preliminary measuring as required by other machines, it is essential that an adequate supply of loose food product be on hand at all times. For this purpose, a control operator is mounted to each slug forming ram, and when the supply of product runs low, as indicated by the position of a ram, more loose food product is brought forward to the turret. In its broadest function, the control may be used to adjust the rate at which loose food product is delivered to the machine by a conveyor or through a chute.

The slug forming turret of this invention particularly includes a novel and useful apparatus for rapidly adjusting the size of each metering pocket. Similar to the teaching of United States Patent No. 3,026,660, the slug forming turret of this machine utilizes metering pistons that are moved into and out of the metering pockets as the turret rotates; and like the earlier teaching, this invention uses metering pistons that are operated by a cam whose position may be vertically adjusted for forming food slugs of either large or small size. But the machine herein described is provided with a novel cam elevating mechanism that may be operated to quickly and easily position a control cam in the vertical direction without affecting its horizontal orientation or its relationship to other parts of the machine.

Although this invention has many objects, a primary object is to provide a simplified apparatus for forming uniform slugs of food and transferring that slug from a metering pocket into a can body.

It is another object of this invention to provide a can filling machine of the kind described, comprising a slug forming turret that is capable of receiving a substantially homogeneous and loose food product and completely forming a compressed slug of food having predetermined size and weight.

Another object of this invention is to provide a turret having slug forming rams that are continuously subjected to the same and substantially uniform pressure so as to provide food slugs of uniform compression and weight.

Another object is to provide a metering or measuring compartment that may be easily adjusted in size for forming food slugs of different sizes.

Another object is to provide a canning machine of the kind described, including operating controls for maintaining a proper amount of food material in the food retaining compartments of a slug forming turret.

A further object is to provide an improved canning machine of the kind described, having fewer number of parts than previously required and being of compact size.

Other objects of this invention will become apparent in view of the following detailed description and accompanying drawings.

In the drawings forming a part of this application and in which like parts are identified by like reference numerals throughout the same.

*General description of machine*

In general, the machine shown comprises a first turret 10 for forming a metered slug of food product and a second turret 11 for transferring a slug of food product and a second turret 11 for transferring a slug of food product from a metering pocket into a can. Both turrets are supported on a common frame, including legs 12 and gear housing 13, and are driven by a motor assembly 14.

Power is transmitted through a vertical drive housing 15 and distributed to the turrets through gearing in a gear box 13. Turrets 10 and 11 are interconnected by a continuous chain 16 of link-connected metering pockets 17, said chain being driven synchronously with the movement of turrets 10 and 11 so as to align the metering pockets with the rams of respective turrets.

In operation, and as the turrets 10 and 11 are rotated, loose food material is deposited upon a table 18 of the turret 10 by means of a conveyor $C_1$, schematically shown in FIGS. 1, 2, 6 and 14. The conveyor may be of conventional construction, such as a belt or a chute, but having an electrically operated control circuit for delivering loose food product onto table 18 when energized. As the turret 10 rotates, the food product is deposited into receiving containers 19 located below the upper surface of table 18. Within less than one rotation of turret 10, the food in containers 19 is compressed by slug forming pistons 20 of rams 21, forming a slug of food in metering pockets 17 of the link-connected chain 16. Thereafter, and as chain 16 moves around turret 11, transfer piston members 22 of plug forming rams 23 effect a transfer of food product into can bodies B. Conventional types of can conveyors are employed for bringing can bodies into position subjacent the metering pockets, such as a standard rail conveyor $C_2$ comprising a pair of support rails 24. A second rail conveyor $C_3$ having rails 25 may be used for supporting the filled can bodies as they are moved away from the machine and delivered onto an auxiliary belt conveyor, not shown.

Description of slug forming turret

Referring to FIGS. 1–3 and 5–9 in particular, slug forming turret 10 comprises a stationary spindle 30 supported at its lower end by the plate 31 of gear housing 13 and stabilized at its top end by support arm 32. The upper end of a flanged spindle 33 is received in bushing 34 of support arm 32 and the lower end of spindle 33 is received in a bushing 35 provided in the recessed end of support spindle 30.

Figure 3:
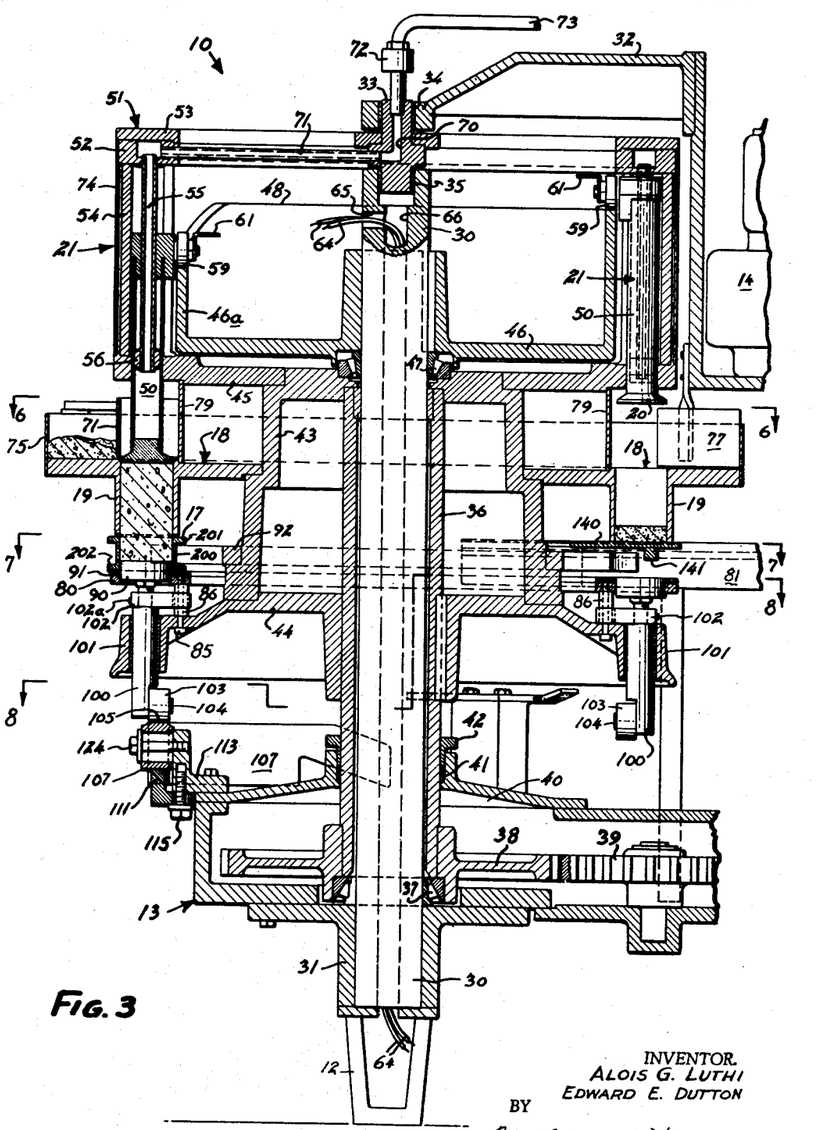
FIG. 3 is a vertical section of the slug forming turret taken on lines 3—3 of FIG. 2.

A tubular turret shaft 36 is rotatably mounted around spindle 30, being supported upon a Timken thrust bearing 37 and upon the upper surface of plate 31. Shaft 36 is adapted to be rotated by gear 38 which is in turn driven through an idler gear 39. An upper cover housing 40 forming a portion of the transmission housing 13 vertically stabilizes the tubular shaft 36, and a packing gland 41 is held in place by a flanged bushing 42.

Turret 10 further comprises a stepped turret housing 43 that is mounted on a plate 44 keyed to and supported from tubular shaft 36. An upper housing plate 45 is secured upon a peripheral shoulder of housing member 43, and stationary cam plate 46, keyed to the upper end of spindle 30, is supported upon a Timken roller bearing 47, which rests upon the hub portion of housing 43. It will be evident, therefore, as shaft 36 is rotated turret housing 43 and plates 44 and 45 are rotated relative to spindle 30 and cam plate 46.

Figure 14:
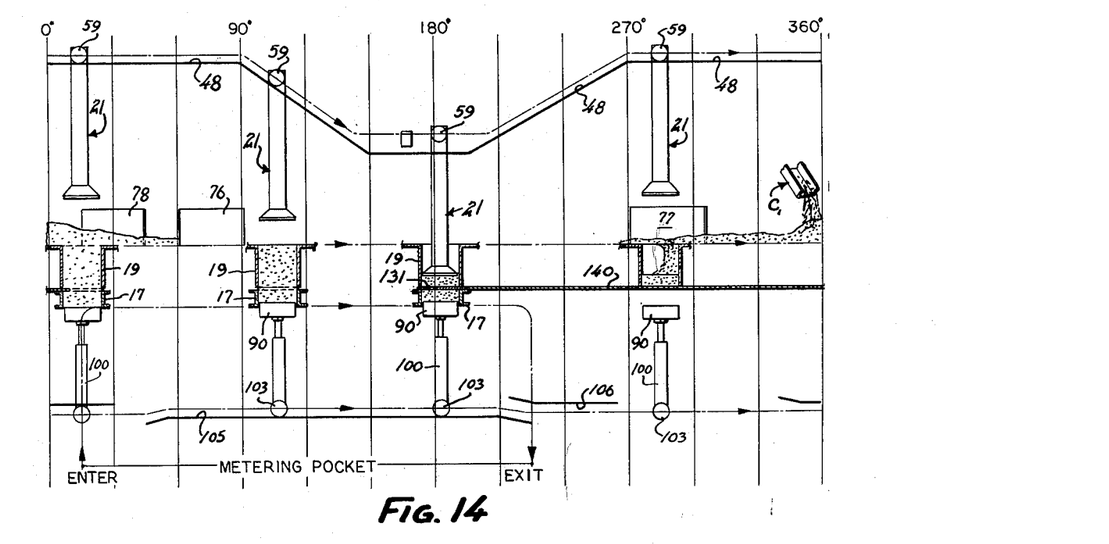
FIG. 14 is a schematic elevation illustrating the timed operation and movement of the slug forming pistons and the metering pistons for one rotation of the slug forming turret, said view representing an extended elevation of certain piston positions between lines 14—14 of FIG. 2.

It may be noted at this time that cam plate 46 has a continuous circular barrier portion 46a, the upper surface of which defines an irregular cam surface 48 having an extended profile, best shown in FIG. 14. Surface 48 controls the operation of rams 21 although each ram is moved downwardly with a constant and uniform biasing force imposed by a fluid pressure means including apparatus now to be described.

Turret plate 45 supports rams 21, including a plurality of piston sleeves 50 which are disposed vertically and arranged equidistantly around the circumference of the turret. A continuous manifold ring 51 comprising a cavitized ring body 52 and a ring plate 53 is mounted to and supported from the upper ends of vertically slotted cylindrical ram housings 54. Vertical air pipes 55 are provided within housings 54, said pipes fluidly connecting the interior of manifold ring 51 with the interior of cylindrical piston sleeves 50. Piston members 56 are secured to the end of pipes 55 to fluidly seal the interior of the piston sleeves.

Figure 5:
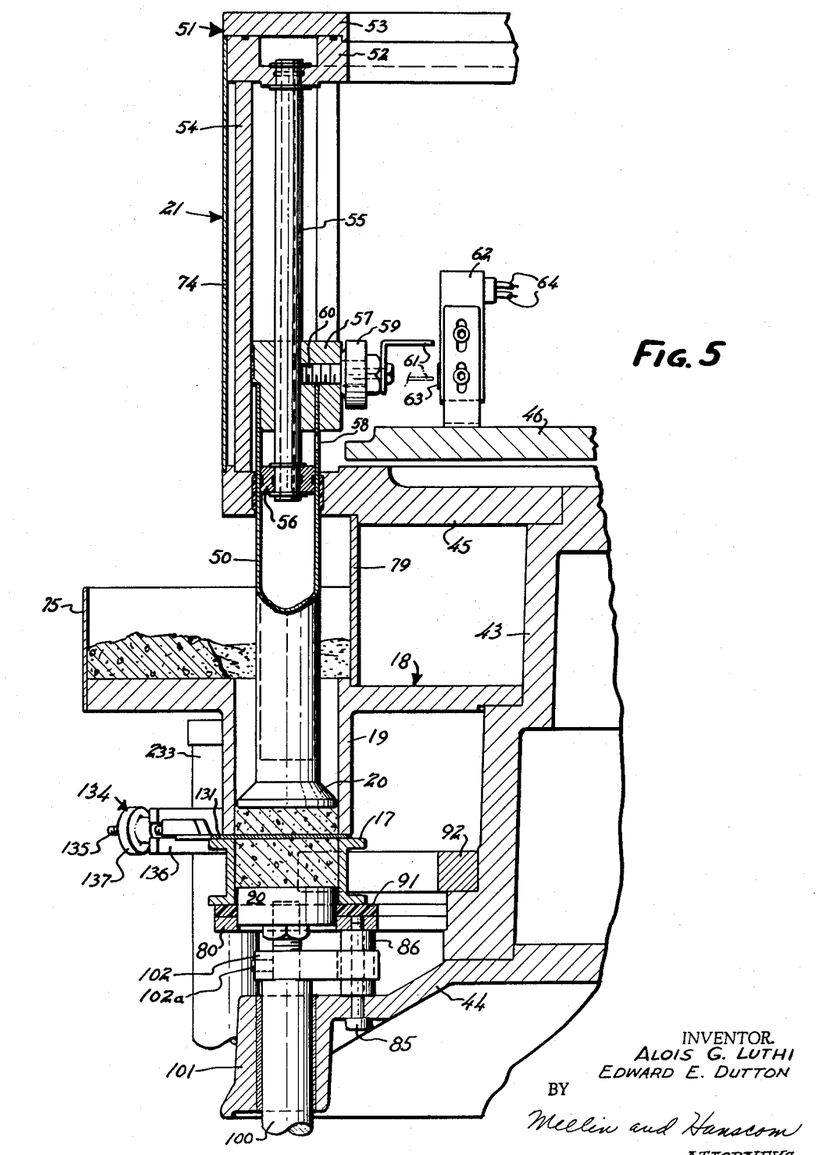
FIG. 5 is an enlarged section of a portion of the slug forming turret taken on lines 5—5 of FIG. 2.

Referring especially to FIG. 5, a mounting block 57 is secured to the end of ram 50, said block having a vertical bore therethrough for receiving the pipe 55. A port opening 58 is provided near the upper end of rams 50 to permit breathing within the rams above pistons 56.

A cam follower or roller 59 is mounted to each block 57 by means of a bolt 60, and each roller moves on top of cam surface 48 during at least a portion of turret rotation. Ordinarily, the pressure within the manifold ring forces piston sleeves 50 downward until their respective rollers 59 rest upon the surface 48. During the food compression portion of the turret cycle, however, the cam surface 48 falls away to a level below that which will insure a sufficient movement of pistons 20 to fill the pockets 17 with compressed food.

Bolts 60 also secure an angle piece 61 to each block 57, and as the turret is rotated the angle pieces are moved past a switch box 62. Angle pieces 61 are made of iron and switch box 62 contains a magnetic proximity switch of standard construction including a magnetized plate 63.

Switch box 62 is located upon the stationary cam plate 46 such that angle pieces 61 will be in their lowest position when they pass by. This occurs immediately after the food material has been compressed in the metering pockets 17, and while the slug of food is being separated from excess compressed food disposed within receiving containers 19. At this time, the angle piece 61 opposite switch box 62 will occupy a vertical position which depends solely upon the amount of compressed food remaining in its associated container 19. When the amount left in the containers 19 is nil, angle piece 61 will be vertically positioned opposite magnetized plate 63, thereby triggering a switch for energizing the feed conveyor $C_1$ and causing more uncompressed food product to be delivered onto table 18.

The lead wires 64 of switch box 62 extend through a lateral opening 65 and the coaxial passageway 66 of spindle 30. Referring to FIG. 3, manifold ring 51 is fluidly connected with a pipe 71 to one end of a T passageway 70 provided in the spindle 33. The vertical end of passageway 70 is connected with a rotatable coupling 72 to an air pressure line 73 that is maintained under constant and substantially uniform pressure.

A cylindrical shield 74 is provided around the upper end of turret 10, being supported upon turret plate 45 and laterally abutted against the continuous manifold ring 51. The shield plate serves to enclose the upper head of the turret.

Figure 6:
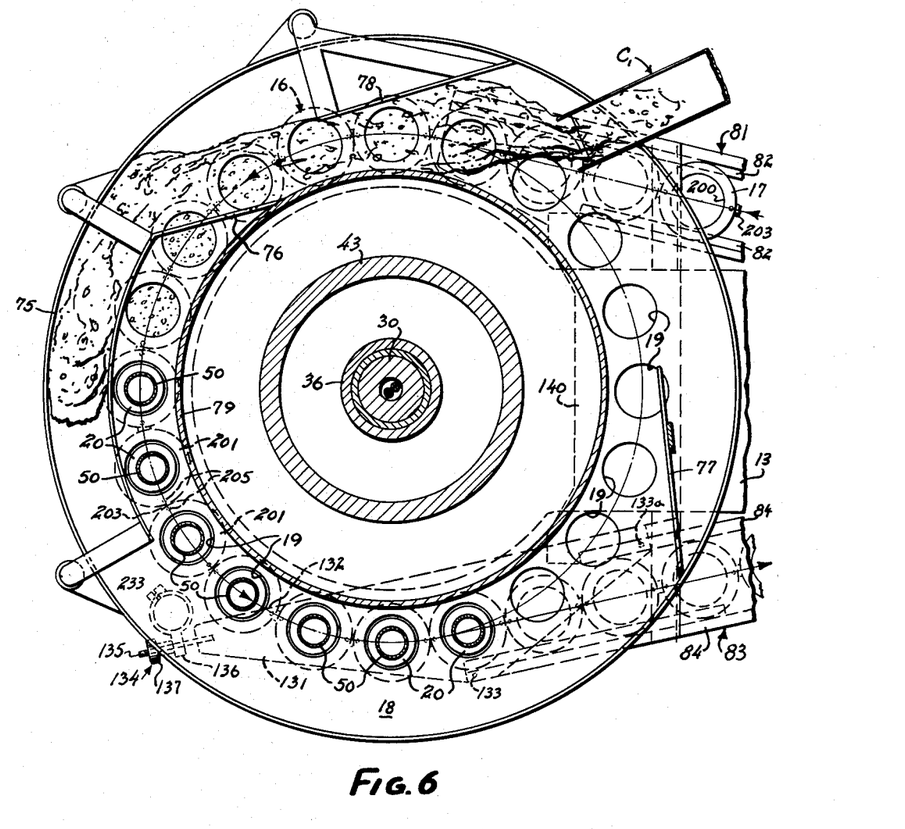
FIG. 6 is a horizontal section taken on lines 6—6 of FIG. 3.

Table 18 includes a cylindrical barrier plate 75 that extends circumferentially around and outside of openings into containers 19. Plate 75 retains loose food material upon the table when it is moved to the outside by a shuttle plate 76, best shown in FIG. 6. Referring to FIG. 6, it will also be apparent that shuttle plates 77 and 78 are provided for moving the loose food product from the outside periphery of table 18 into a circular pathway above containers 19. Shuttle plate 77 is particularly located for moving food back to the inside after it has been moved to the outside by shuttle 76. Shuttle plate 78 is disposed relative to conveyor $C_1$ so that food which is deposited onto table 18 will be directed into or over containers 19. A cylindrical barrier plate 79 limits the inward movement of the food, said plate extending vertically above the table and laterally contacting a peripheral shoulder on upper housing plate 45.

The continuous chain 16 of link-connected metering pockets 17 is supported upon a ring plate 80 as the pockets are rotated around turret 10. The pockets are delivered onto this plate from a support bridge 81 including a pair of parallel support rails 82; they are moved onto a second bridge 83 including a support plate 84 as they leave turret 10 and move toward turret 11. Plate 80 is supported from housing plate 44 by means of bolts 85 and spacer sleeves 86.

Plate 80 is provided with openings therein for receiving a metering piston 90, the upper surface of which forms the bottom of a metering pocket 19 as food material is being compressed to form a slug. A nylon stripper plate 91 of substantially identical shape to plate 80 overlies said plate to form a relatively frictionless bearing surface for the metering pockets 19.

The chain of metering pockets is guided around turret 10 and positioned relative to pistons 20 and 90 by a star wheel 92 which is secured to the housing 43 as by means of bolts.

Pistons 90 are mounted to the end of a rod 100 guided in bearing supports 101 that extend radially outward from plate 44. The pistons are also guided by a stabilizing guide member 102 secured to rod 100 by a set screw 102a. Guide member 102 is formed with a bifurcated end that receives sleeve 86 with a sliding fit.

A roller member 103 is mounted upon a pin 104 at the bottom end of rod 100. Roller 103 tracks upon the cam surface 105 for a portion of the turret rotation. A cam surface 106 is disposed relative to rollers 103 to engage the top surface of said rollers, as shown in FIG. 9, to retract the pistons 90 out of the metering pockets after a slug of food material has been formed therein.

Figure 8:
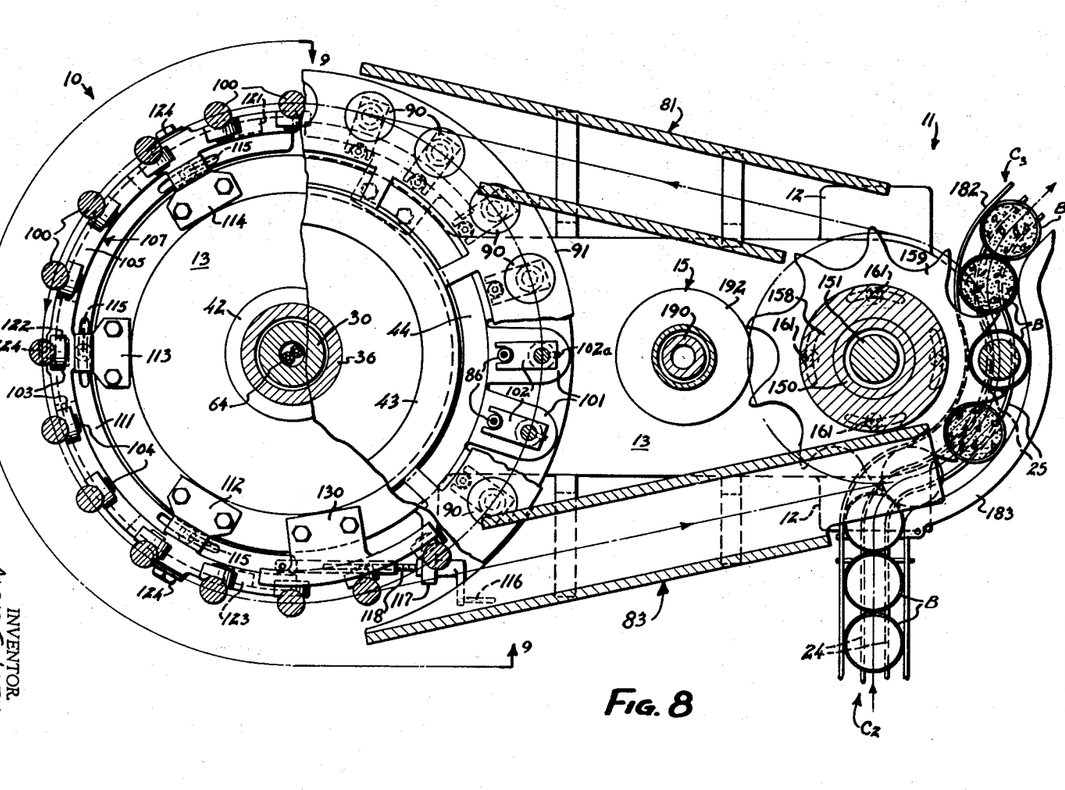
FIG. 8 is a substantially horizontal section taken on lines 8—8 of FIGS. 3 and 4, and with portions broken away.
Figures 9, 10, 11, 12, 13:
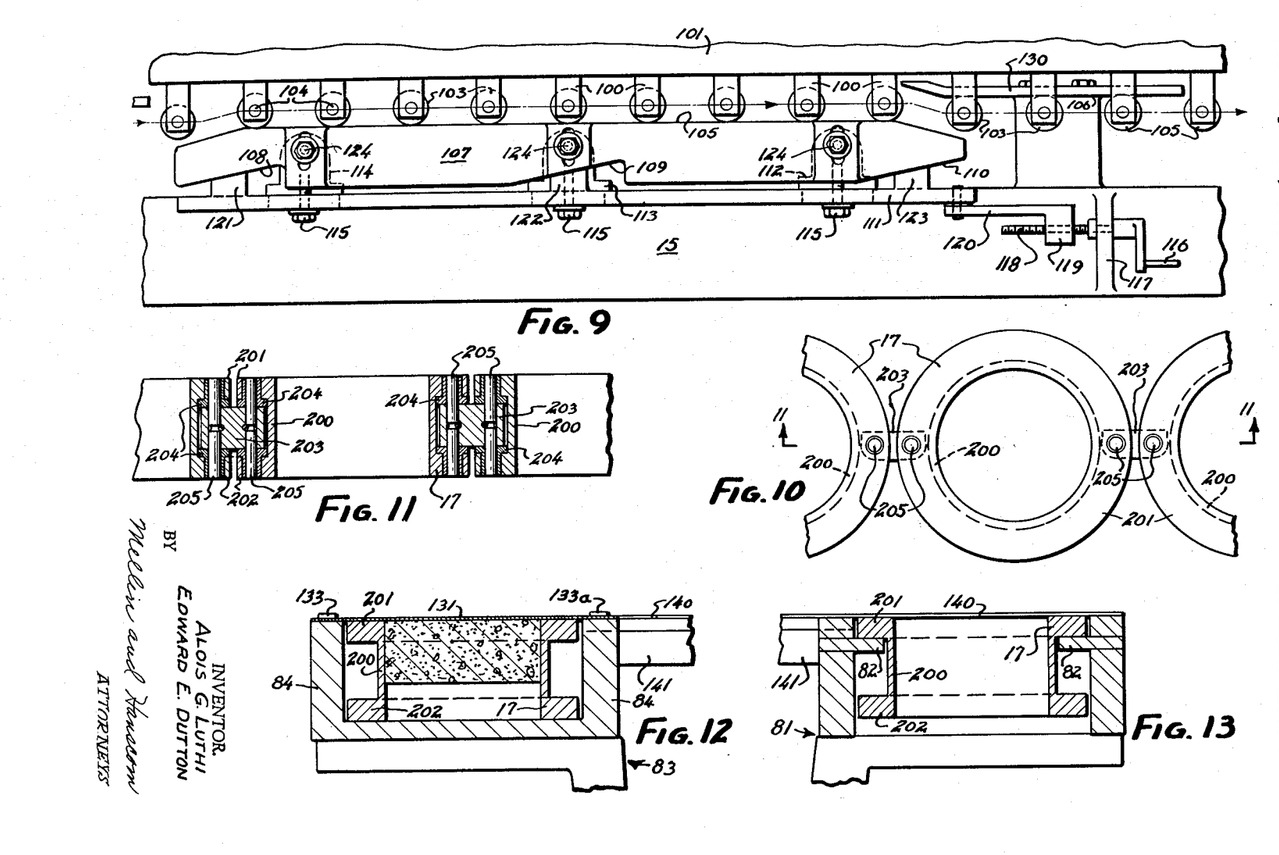
FIG. 9 is an extended elevation of a cam track disposed circumferentially of the slug forming turret between lines 9—9 of FIG. 8.
FIG. 10 is a plan view of a link-connection of the chain of metering pockets.
FIG. 11 is a vertical section taken on lines 11—11 of FIG. 10.
FIG. 12 is a vertical section taken on lines 12—12 of FIG. 2.
FIG. 13 is a vertical section of the metering pocket taken on lines 13—13 of FIG. 2.

Cam surface 105, as best shown in FIG. 9, is formed on an arcuate cam member 107, having symmetrically arranged lower inclined surfaces 108, 109 and 110. Cam member 107 is supported upon an arcuate elevator plate 111 that is in turn mounted upon angle plates 112, 113 and 114. Referring to FIGS. 3, 8 and 9, elevator plate 111 is more particularly supported by bolt members 115 which are threaded in each of the angle plates 112-114, and being received through arcuate slots provided in the elevator member 111. It will be noted that elevator 111 may be moved or angularly adjusted about the axis of turret 10. Such an adjustment may be made by operation of a screw means comprising a crank 116 rotatably mounted upon a support member 117 for turning a threaded shaft 118. An internally threaded collar 119 travels upon shaft 118 and is rigidly secured to an actuating member 120, pinned to the end of elevator 111.

Referring again to FIG. 9, cam 107 although supported by the elevator 111, and more particularly upon the inclined feet 121, 122 and 123, is horizontally stabilized and held by bolt members 124, which are received through slotted openings in the cam member 107 and threadedly secured in the angle mounting plates 112, 113 and 114.

It will be readily seen that the cam member 107 may be quickly and easily raised by operation and angular movement of the elevator 111 through operation of the crank 116. Referring to FIG. 9, a movement of the elevator 111 toward the right would tend to move the feet 121, 122 and 123 along the surfaces 108, 109 and 110, respectively, of cam 107, allowing the cam to vertically descend. A movement of elevator 111 toward the left would have the opposite effect, tending to raise the cam surface 105.

Cam surface 106 is provided on the lower side of a cam plate 130 having a flanged portion bolted to the cover 40 of gear housing 13. Referring to FIG. 9, rollers 103 come in engagement with surface 106 as they complete the run across the surface 105. In fact, the rollers 103 are trapped between surfaces 105 and 106 for a small angle of turret rotation. During such movement, metering piston rods 100 are forced downward pulling their pistons 90 until they are completely retracted from the associated metering pockets. The upper surfaces of pistons 90 move into positions no higher than the top surface of plate 91.

Figure 7:
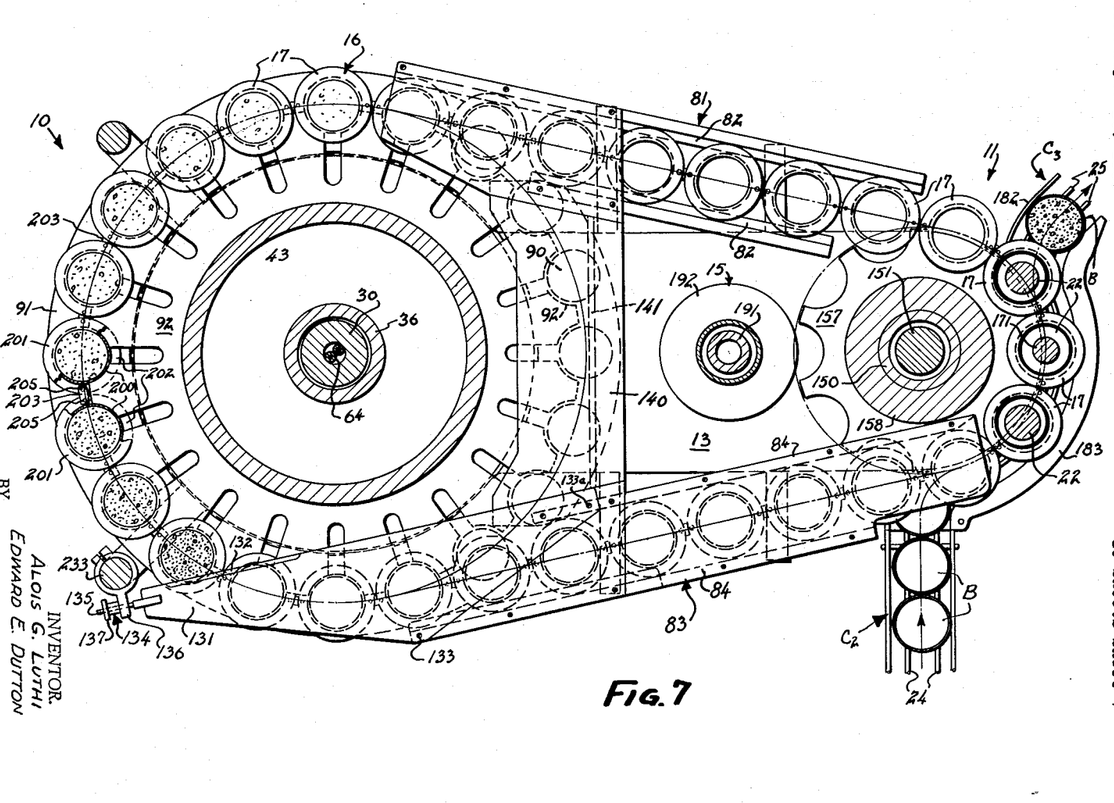
FIG. 7 is a horizontal section taken on lines 7—7 of FIGS. 3 and 4.

Shortly before the metering pistons 90 are retracted from the metering pocket 17, the slug of food material compressed within the metering pocket is severed from the material within the aligned food receiving container 19. Referring to FIGS. 5-7, there is shown a stationary knife blade 131 having a cutting edge 132 and being stretched between ends. The blade is secured at one end by pins 133 and 133a to the bridge 83, and an adjustable anchor 134 mounts the other end to a support arm 233. The adjustable anchor 134 includes a threaded shaft 135 secured to blade 131, a lateral support 136 mounted to support arm 233 and a stop nut 137, threadedly mounted to the end of rod 135 and engageable with support 136. Referring to FIGS. 6 and 7, it will be seen that the blade 131 is arranged so its edge 132 is disposed angularly relative to the path followed by the metering pockets during rotation around turret 10. Accordingly, the pockets move past the blade 131 with a wiping movement along the cutting edge 132. When the slug of food in a metering pocket has been completely severed from the food material disposed in the aligned container 19, the pocket and container will be entirely separated by the blade 131. Thus, a portion of blade 131 serves as a dead plate which prevents food material from falling out of containers 19 while the metering pockets are moved between positions proximate to knife edge 132 and positions where they are advanced upon bridge 83. A primary dead plate 140 is disposed substantially coplanar with knife 131 and provides a continuous surface beneath containers 19 during that portion of the turret's rotation when no metering pocket is aligned with the containers. Plate 140 is reenforced from beneath by a rod 141 and is supported between bridges 81 and 83.

Figure 1:
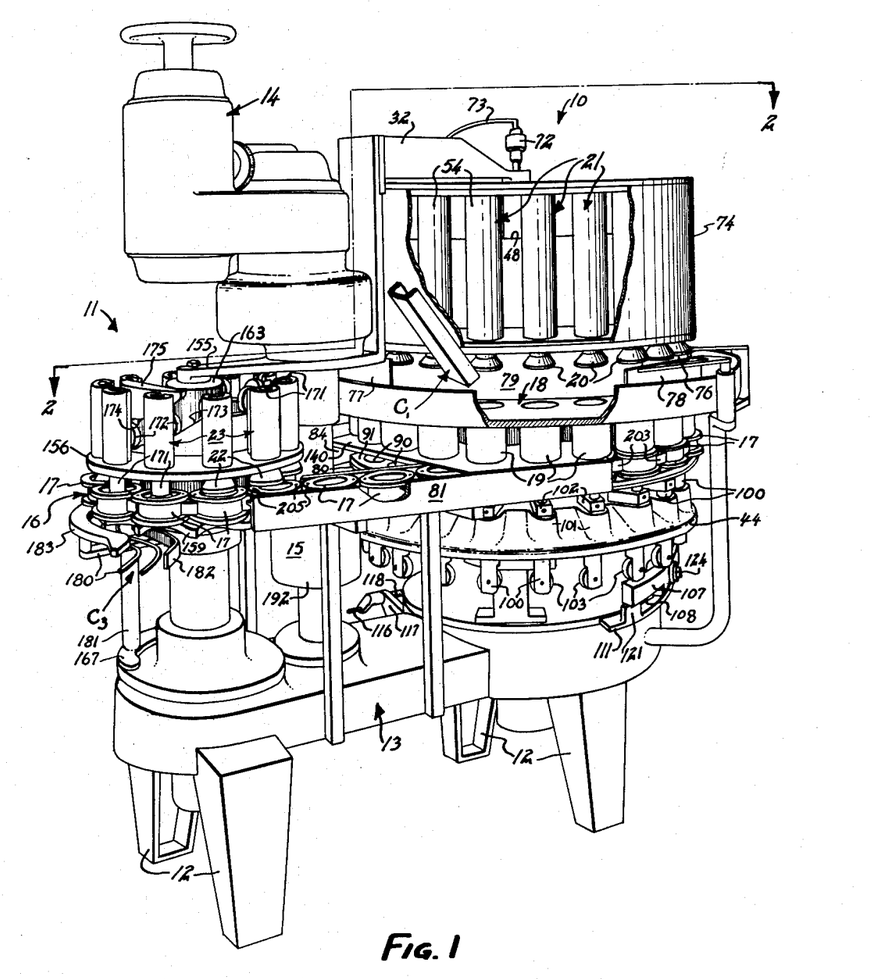
FIG. 1 is a perspective view of a preferred form of the invention embodied in a can filling machine.
Figure 2:
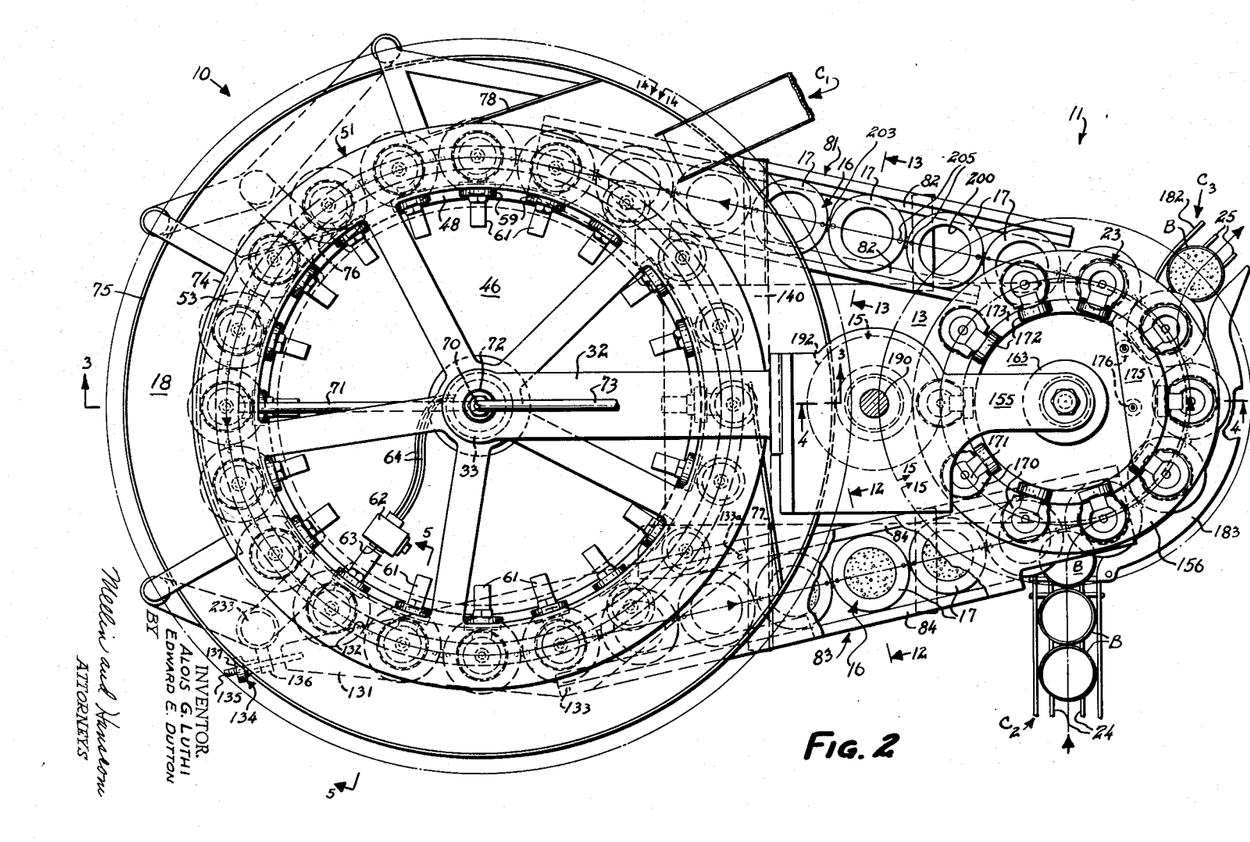
FIG. 2 is a plan view of the machine with parts removed or broken away to show its interior construction, said view being seen on lines 2—2 of FIG. 1, looking from the rear.

The operating cycle of turret 10 will be best understood in view of FIGS. 2 and 14. As metering pockets 17 are received upon plate 80 of turret 10 they are almost immediately aligned with a ram 21 and its subjacent food receiving container 19. Until the metering pockets are positively registered with a container 19, dead plate 140 serves as a bottom to each container 19 which may by this time be filled by loose food product that has been moved inwardly from the peripheral edge of table 18 by the shuttle 77. Additional loose food material may be moved in towards the openings of containers 19 by the shuttle 78. During the filling of compartments 19, of course, rams 21 are withdrawn from the compartments by the positive actuating movement of cam rollers 59 riding upon the highest portion of cam surface 48.

After containers 19 have been filled, the excess food product is swept out by shuttle 76, and almost simultaneously the ram associated with that container begins to move downwardly under the constant and uniform biasing pressure that is maintained upon the ram. Simultaneously, a metering piston 90 moves upwardly into the metering pocket 17 to establish a metering compartment of predetermined size within the pocket.

Soon after rams 21 are allowed to move downwardly and compress the food product into metering pockets, the slug of food product formed therein comes into engagement with knife 131, severing the slug from other compressed food within container 19. Continued rotation of turret 10, and the upward movement of rollers 59 along the inclined surface of cam surface 48, effects a withdrawal of rams 21. Similarly, pistons 90 are simultaneously retracted by the rolling contact between rollers 103 and cam surface 106. The metering pocket is then moved across the bridge 83 toward the transfer turret 11, and the bottom of openings of containers 19 are covered either by knife 131 or the dead plate 140 until such time that the compartment is again aligned with another metering pocket. Soon after a pocket is separated from an aligned container, additional loose food product is moved into the container 19, but only after the associated ram 21 is moved to a fully retracted up position.

*Description of transfer turret*

Transfer turret 11 functions substantially the same as transfer turret shown and described in U.S. Letters Patent No. 3,026,660. Turret 11 distinguishes therefrom, however, in a compactness of design requiring fewer parts.

Turret 11 comprises a tubular shaft 150 mounted for rotation upon a spindle 151 and driven by a gear 152 meshed with an idler pinion 153. Spindle 151 is supported by a cover plate 154 which forms part of the gear casing 13, and the upper end of spindle 151 is stabilized by an arm 155 mounted to the drive transmission housing 15.

A rotatable turret assembly comprising a ram plate 156, a pocket supporting star sprocket 157, a spacer ring 158, a can driving star 159 and a support collar 160 is mounted to shaft 150 as by means of bolts 161 and cap screws, not shown. The assembly is keyed to shaft 150 by a spline connection 162.

A dished cam plate 163 surmounts the turret assembly, being supported upon a roller bearing 164 disposed axially upon the upper end of shaft 150. Cam plate 163 is made rigid with spindle 151 by a spline connection 165 so that the plate's position will remain fixed while the turret assembly is being rotated.

The lower end of turret shaft 150 is supported upon a roller bearing 166 that rests upon cover plate 154. Shaft 150 is also stabilized by a collar plate 167 which receives a packing gland 168 and a flanged bushing 169.

Figure 4:
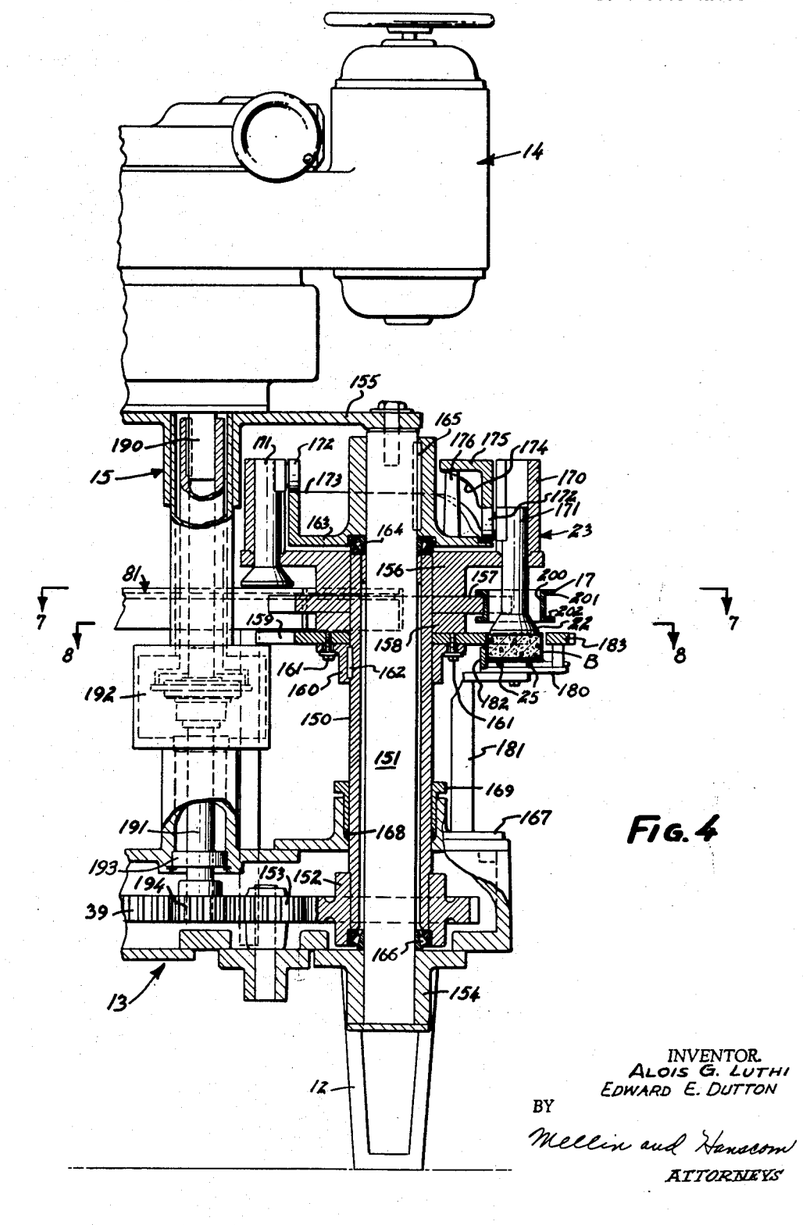
FIG. 4 is a vertical section of the transfer turret taken on lines 4—4 of FIG. 2.

Referring to FIG. 4 in particular, ram plate 156 supports transfer rams 23 including a plurality of cylindrical ram guides 170, each of which is formed with a vertical slot. A piston rod 171 is reciprocally disposed within each guide 170, and to each rod there is mounted a roller 172 that rides upon the continuous cam surface 173 of cam plate 163.

A second roller engaging cam surface 174 is provided on an arcuate angle plate 175, said plate being mounted from cam plate 163 and a pedestal 176.

FIGS. 2, 7 and 8 illustrate the manner in which a plurality of can bodies B are fed toward turret 11 upon a conventional rail conveyor C₂. Can bodies B are delivered onto an arcuate support plate 180, itself supported from plate 167 and a pedestal 181. Once the can bodies have been moved onto plate 180 they are then engaged by the extending fingers of star 159, which moves the can bodies along plate 180 while a slug of food is transferred from a metering pocket 17 into a vertically aligned can body. The can bodies are held upon support plate 180 by side rails 182 and 183, best shown in FIG. 4.

Figure 15:
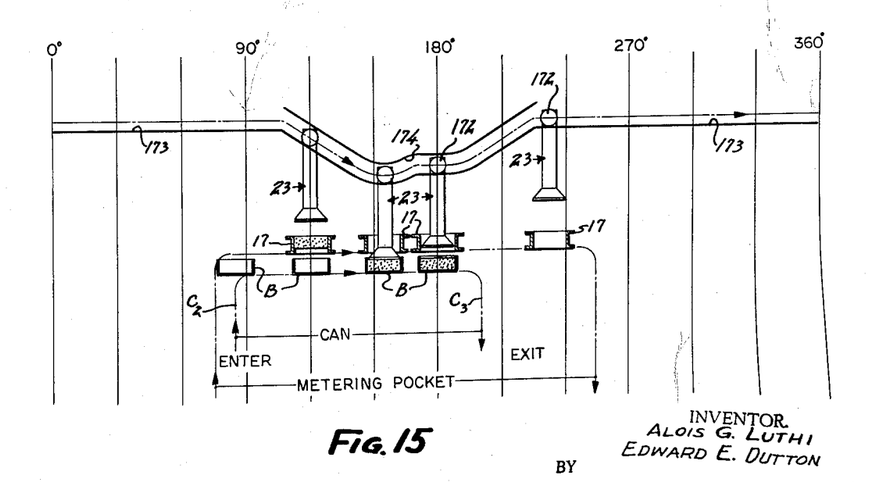
FIG. 15 is a schematic elevation illustrating one cycle of operation for the transfer turret pistons, said view being an extended elevation between lines 15—15 of FIG. 2.

The operation of transfer turret 11 may be followed by referring to the diagrammatic illustration of FIG. 15. Can bodies B are fed onto plate 180 while rams 23 are held in their uppermost positions. At this time, rollers 172 are supported upon the upper cam surface 173. A can body is picked up by the star 159 and brought into vertical alignment with a metering pocket 17 containing a slug of compressed food. While the can body is being positioned by the star, metering pocket 17 is itself being transferred from bridge 83 onto star sprocket 157, which supports as well as positions each metering pocket relative to the pistons 22 of rams 23.

As soon as a can body is placed into vertical registration with a metering pocket 17, piston rods 171 are forced downwardly by the engagement between rollers 172 and cam surface 174. There is a short dwell time during which pistons 22 are allowed to remain within the metering pockets before final retraction; and in this time the can bodies are moved laterally relative to pistons 23. Accordingly, should the slug of food adhere to the end of piston 22, the movement of the can bodies will break the adhesive forces before the piston is withdrawn.

After rams 23 have been fully retracted into their uppermost positions, the metering pockets are transferred onto bridge support 81.

Description of drive assembly and chain connection of metering pockets

As previously indicated, both turrets 10 and 11 are driven by the motor assembly 14 through a transmission housing 15. Referring to FIG. 4, a motor drive supplies power to a vertically disposed drive shaft 190. A lower drive shaft 191 is adapted to be driven by shaft 190 through a clutch and a torque limiter of a standard construction housed within casing 192. Shaft 191 is supported near its lower end by a bearing 193, and drives a pinion 194 which is in mesh with both idler gears 39 and 153.

It will be apparent that gears 38, 39, 152, and 153 are designed or selected so that the rams 21 of turret 10 are rotated at the same linear speed as the rams 23 of turret 11. For convenience of manufacture, and taking into consideration the required size of each turret, the preferred form of the machine utilizes twice as many rams 21 as the number of rams 23. The angular rotation of turret 11 is, therefore, twice as fast as the angular rotation of turret 10.

FIGS. 10 and 11 illustrate a preferred construction of the chain 14 of metering pockets 17. Pockets 17 are formed with a cylindrical body portion 200 having integral flanges 201 and 202 at either end. Flanges 201 and 202 define a recess adapted for receiving one end of a link member 203, and the peripheral edges of those flanges are bored for receiving tubular bushings 204. Both ends of link members 203 are formed with holes which are alignable with holes of identical size in bushings 204. Pin members 205 are inserted through the aligned holes of bushings 204 and link 203, thereby making a link-connected chain of metering pockets. Any one of the pockets 17, it will be noted, may be easily replaced, in the event of damage, by merely removing the pins 205.

Although a preferred embodiment of this invention has been illustrated and described, various changes may be made without departing from the spirit of the invention or the scope of the attached claims, and it is to be understood that such changes are contemplated.

Having thus described our invention, what we claim and desire to secure by Letters Patent is:

1. In a machine for canning food products, a slug forming turret having a plurality of rams including slug forming pistons, fluid pressure means simultaneously communicating with each of said rams for maintaining a uniform biasing force in each ram, cam means including a cam track and cam followers attached respectively to each ram for sequentially moving said pistons against the biasing force of said fluid pressure means.

2. In a machine for canning food products, a slug forming turret having a plurality of rams including slug forming pistons, means including a continuous manifold ring fluidly communicating simultaneously with each of said rams for maintaining a uniform biasing force in each of said rams, cam means including a cam track and cam followers attached respectively to each ram for sequentially moving said pistons against the biasing force of fluid pressure within said manifold ring.

3. In a machine as described in claim 2, said slug forming turret further including a plurality of metering pistons aligned with one of said slug forming pistons and in opposed relation thereto, said metering piston forming one end wall of a metering pocket for a portion of its travel as it moves around said forming turret in alignment with a slug forming piston, cam means including a cam track and cam followers respectively attached to each metering piston for moving said pistons into and out of one end of aligned metering pockets, said cam track having lower inclined surfaces, a cam elevator supporting said cam track and having upper inclined feet engaged with the lower inclined surfaces of said cam track, and screw means for adjusting the position of said elevator relative to said cam track to place its inclined feet along a different portion of the cam track's inclined surfaces.

4. In a machine as described in claim 2, and further including a slug forming turret having a food receiving table, a feed conveyor for placing food material upon said table, circuit means including a control switch for regulating the advance of said feed conveyor, and switch actuating means including members respectively movable with each of said slug forming pistons.

5. In a machine as described in claim 2, and further including a food receiving table having a plurality of food receiving compartments extending downwardly relative to an upper food receiving surface thereof, said compartments being vertically aligned with one of said slug forming pistons and open at both ends, said cam means operating said slug forming pistons between extreme positions above said table and within associated receiving compartments as said turret is rotated.

6. In a machine as described in claim 5, and further comprising a feed conveyor for placing food material upon said food receiving table, circuit means including a control switch for regulating the advance of said feed conveyor, and switch actuating means including members respectively movable with each of said slug forming pistons.

7. In a machine of the kind described, a turret having a plurality of vertically disposed rams including slug forming pistons at their lower ends, said rams being supported radially of the turret axis at equal radial distances, a continuous manifold ring disposed horizontally above said rams and having fluid connections with each ram for maintaining a substantially uniform and constant biasing force upon said rams, a swivel pipe fitting disposed axially of said turret, conduit means fluidly connecting said manifold ring with said fitting, second conduit means for connecting said fitting to fluid pressure source, and cam means including a cam track and cam followers attached respectively to each ram for moving said rams against the imposed fluid pressure bias and positioning said pistons.

8. In a machine as described in claim 7, each of said rams having a cylindrical pressure chamber open at its upper end, vertically disposed tubular pipes fluidly connected at their upper ends with said manifold ring and having lower ends received in the pressure chamber of an associated ram, and means for vertically guiding each ram.

9. In a machine for canning food products, a slug forming turret having a food receiving table and a plurality of rams including slug forming pistons movable from positions above to positions below the upper surface of said table, a pressurized manifold fluidly communicating simultaneously with each of said rams, and cam means for sequentially moving said pistons against the biasing forces of the fluid pressure within said manifold; means for depositing food material upon said table, a control circuit including a control switch for regulating the amount of food material deposited upon said table, and means for actuating said control switch including control members respectively movable with each of said slug forming pistons, said control members being respectively positioned for actuating said control switch when their pistons are moved into positions below the surface of said table and to a level which indicates that an additional amount of food material is required.

References Cited by the Examiner
UNITED STATES PATENTS

| | | | |
|---|---|---|---|
| 2,027,915 | 1/36 | Kux. | |
| 2,216,318 | 10/40 | Lewis. | |
| 2,736,922 | 3/56 | Schieser et al. | 18—30 |
| 2,760,232 | 8/56 | Rougemont et al. | 18—30 |
| 2,881,475 | 4/59 | Wilckens | 18—20 |
| 3,026,660 | 3/62 | Luthi et al. | 53—124 |
| 3,029,470 | 4/62 | Frank | 18—20 |

WALTER A. SCHEEL, *Primary Examiner.*
CHARLES A. WILLMUTH, *Examiner.*